Feb. 11, 1969    R. CURTIS    3,426,544

AQUA-TUBE SUB-SURFACE IRRIGATION

Filed Nov. 24, 1967

INVENTOR:
ROBERT CURTIS
BY
Gravely, Lieder & Woodruff
ATTORNEYS.

United States Patent Office 3,426,544
Patented Feb. 11, 1969

3,426,544
AQUA-TUBE SUB-SURFACE IRRIGATION
Robert Curtis, Rte. 4, Box 253,
Springfield, Mo. 65801
Filed Nov. 24, 1967, Ser. No. 685,713
U.S. Cl. 61—13   4 Claims
Int. Cl. E02b 13/00

ABSTRACT OF THE DISCLOSURE

An irrigation system which includes means for supplying irrigating fluid or water below grade or below the surface of the ground, said means including a fluid distributor conduit having spaced perforations, a distributor conduit enclosing the feeder conduit and itself provided with perforations, and means retaining the conduits in spaced relation to provide a chamber therebetween which is flooded with the irrigating fluid so as to maintain a supply distributed substantially equally to the perforations in the distributor conduit.

---

This invention relates to improvements in means for obtaining substantially uniform sub-surface distribution of water for irrigation purposes.

For purposes of this disclosure the improved means of this invention will be described in connection with sub-surface area or field irrigation such as is applicable to nursery operation, truck gardening, lawn, tree and shrub layouts, and similar planted areas.

A persistent problem in the field of this invention has been the erratic distribution of water to a given area resulting in over and under watering of sections of the area. Attempts have been made to overcome this problem by high pressure systems or by complicated piping layouts. When substantial equalization of water distribution has been obtained it has been accomplished with great expense in apparatus.

The present invention relates, therefore, to means by which economies in equipment are realized and substantially uniform distribution of irrigation water results, whereby a most important object of the invention is attained.

It is also an important object of this invention to provide a unique and positive system for obtaining sub-surface irrigation with low cost apparatus.

A further object of this invention is to provide means for sub-surface soil irrigation in which equalization of water can be achieved from a low pressure source.

Yet another object of this invention is to provide an aqua-tube system for transmitting irrigation water substantially uniformly over large areas and to accomplish this objective from a low pressure source of supply.

A preferred system embodies the use of relatively inert conduits in which a network of feeders are encased by distributors, the feeders and distributors being selectively perforated to effect equalization of delivery of water at low pressure from a supply header to which the feeders are connected. The system of headers, feeders and distributors is by preference located underground so that evaporation is avoided and the water is delivered to the root zone of plants to be irrigated.

The advantages of the preferred system, and additional objects thereof, will be set forth in the following description of the several views in the accompanying drawing, wherein.

Figure 1:
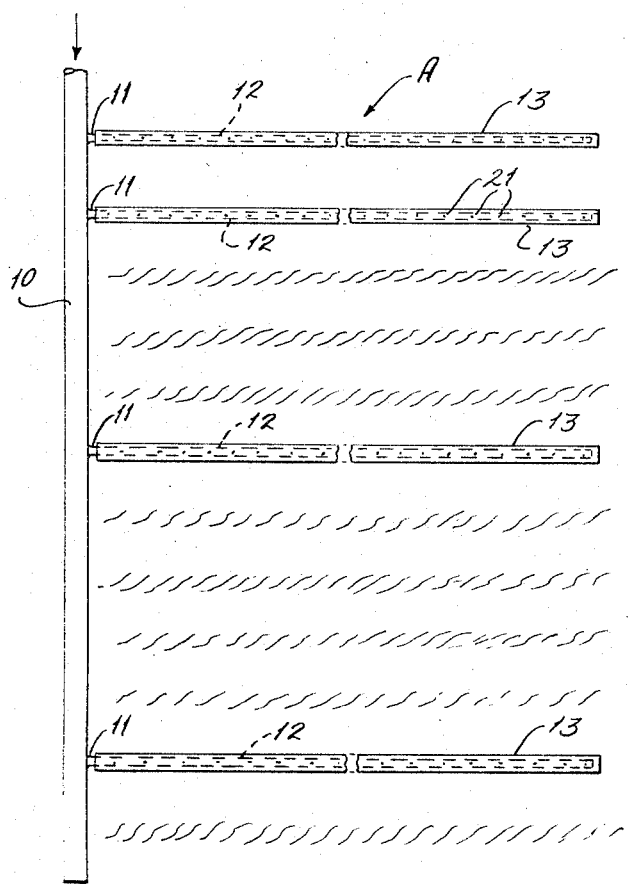
FIG. 1 is a schematic plan view of a system of conduits installed in an area to receive sub-surface irrigation according to the principle of this invention.

Referring now to FIG. 1 the field or area A to receive sub-surface irrigating water is provided with an elongated header conduit 10 that is connected to a water supply (not shown). The water is supplied to conduit 10 at from 5 to 20 pounds pressure. The conduit 10 has a series of spaced outlet T's or nipples 11 which may have approximately a one-half inch diameter. The spacing of nipples 11 may be on approximately thirty inch centers, or at a spacing to suit the planting layout. Each nipple 11 is connected to a feeder conduit 12 which extends outwardly into the field area to be irrigated. Conduits 12 may be continuous lengths of up to about one hundred feet. When more area is to be irrigated, additional lengths of conduit 12 are added by suitable fittings (not necessary to show). Such additional conduits 12 may also be lengths of up to about one hundred feet, and the total reach of the feeder conduits 12 will then span the width of the area A to be irrigated. The feeder conduits 12 are each encased in distributor conduits 13 having a length to match the feeder conduits 12 with closures at each end so that the water in the distributor conduits may not have an uncontrolled outflow.

Figure 2:
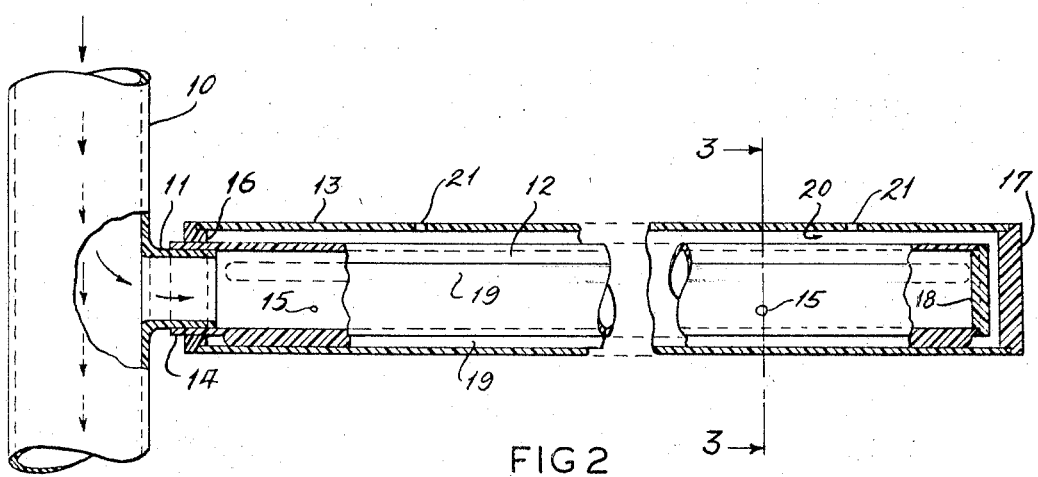
FIG. 2 is a greatly enlarged and fragmentary sectional view of a typical arrangement of a header conduit supplying water to a feeder conduit that is encased in a distributor conduit.
Figure 3:
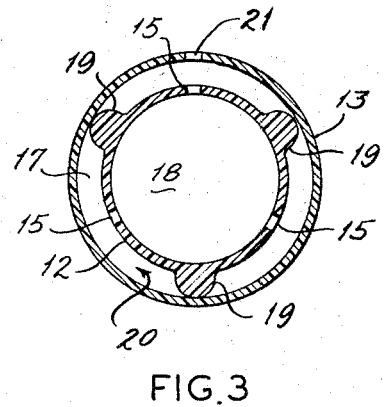
FIG. 3 is a transverse section taken at line 3—3 in FIG. 2.

The details of a typical organization of conduits may best be seen in FIGS. 2 and 3, and reference will now be directed to these views. The header 10 and outlet nipple 11 are shown connected to a feeder conduit 12 in which the supply end 14 of the feeder telescopes over the nipple 11 in a fluid tight fit so that no leakage results. The feeder conduit 12 runs laterally outwardly to the selected length for the field in question, and at spaces of approximately ten feet an orifice 15 is provided.

Each feeder conduit 12 is encased in a distributor conduit 13, the latter having a suitable closure collar 16 fitted over the feeder conduit 12 at the supply end 14 thereof. The distributor conduit 13 extends in one length or in several lengths (depending on the length selected for feeder conduit 12) to the outer end of the feeder where the closure 17 is mounted so as to be spaced from the end closure 18 for the feeder conduit 12. As is seen best in FIG. 3, the feeder and distributor conduits 12 and 13 respectively are maintained in spaced relation by longitudinal ribs or protuberances 19 provided on the exterior of the feeder conduit 12. It is of course, understood that the elements 19 may be formed on the interior of the distributor conduit 13. Whichever form of spacing element is selected it is the aim to maintain throughout the length of the conduit 13 a flood chamber 20 which is fed by orifices 15, and for this purpose the protuberances 19 extend longitudinally and these are spaced circumferentially such that the weight of the earth does not collapse the distributor conduit and close the flood chamber, and so that the feeder conduit does not become misaligned to distort the chamber 20.

It can now be understood that each feeder conduit 12 supplied with water at nipple 11 feeds water through the orifices 15 into the flood chamber 20 and maintains the chamber 20 under a presure substantially equal to that in the supply header 10. Each distributor 13 is formed with a plurality of delivery orifices 21, each orifice 21 having the same diameter, and such orifices being formed on approximately thirty inch centers. In order to obtain a substantial equalization of water supply into the flood chamber 20, the orifices 15 in the feeder conduit 12 are graduated in size from a group or series of smaller orifices near the inlet nipple 11 to a group or series of larger orifices near the outer end closure 18. Successful systems having the feeder conduit 12 composed of four sections, each of about one hundred feet, have used orifices in the first section connected to nipple 11 of about one sixteenth inch, the next section has had five sixty-fourths inch orifices, the third section has had orifices of about three thirty-seconds inch, and the outermost section has had orifices of about seven sixty-fourths inch. The graduated size or grouping of orifices in the feeder conduit 12 causes the water to flow outwardly over the entire length and to maintain a substantially uniform supply into the flood chamber 20 throughout its length. In this way the more numerous delivery orifices 21 (being set closer together than orifices 15) are able to deliver uniform quantities of water to the surrounding soil.

The several conduits 10, 12 and 13 are extrusions formed, by preference, of polyethylene material which is relatively inexpensive and substantially inert to attack from chemical fertilizers. Such material is also flexible, has adequate strength for the maximum water pressure applied to the system and has long life qualities.

The foregoing irrigation system is preferably placed underground from about six to twelve inches, and can be plowed in or pulled in with suitable devices available for such purpose.

A system of the character above described reduces loss of valuable water by evaporation because the water is released underground to the plant root system. The operation of the system may be continuous or selective, depending on the needs of the area being irrigated, and the use of polyethelene or non-metallic material for the several conduits eliminates many of the troublesome maintenance problems heretofore experienced. Furthermore, the important principles of providing substantially uniform water distribution is obtained by forming a flood chamber 20 within the distributor conduit 13 to which water is supplied uniformly and under relatively low pressure. It is an important characteristic of the system that elements 21 are provided to maintain the continuity of the flood chamber 20 so that pressure equalization within the entire length of each distributor conduit 13 is assured. Having, therefore, provided a simple conduit system which can substantially uniformly distribute water, a field may be irrigated without tendencies to over water some areas and under water other areas.

Having set forth the principles of this invention in connection with a presently preferred system it can be appreciated that changes and modifications will come to mind, and it is intended to include all possible changes and modifications within the scope of the appended claims. It is to be understood that the dimensions above recited are provided for reference purposes and no unnecessary limitations are to be implied therefrom.

What is claimed is:

1. In a sub-surface irrigation system, the improvement of a distributor conduit having an open end, an opposite closed end and a plurality of outlet orfices spaced apart along its length to distribute irrigating fluid into the surrounding sub-surface, an elongated irrigating fluid feeder conduit extending through said open end of said distributor conduit and running to a closed end adjacent said closed end of said distributor conduit, said feeeder conduit having an open end and delivery orifices spaced along its length inside said distributor conduit, means between said distributor and feeder conduits maintaining said conduits in spaced relation to form a chamber therebetween for the collection of irrigating fluid surrounding said feeder conduit, each of said delivery orifices and said distribution orifices being in fluid communication with said chamber, and means connected to said open end of said feeder conduit to supply the irrigating fluid thereto for flow through said delivery orifices into said collecting chamber.

2. The improvement set forth in claim 1 wherein said delivery orifices in said feeder conduit are less numerous than said outlet orifices in said distributor conduit.

3. The improvement set forth in claim 1 wherein said delivery orifices are graduated to a larger size toward said closed end and said outlet orifices are substantially the same size.

4. The improvement set forth in claim 1 wherein said spacing means between said distributor and feeder conduits comprises rib elements spaced apart and extending longitudinally within the irrigating fluid collecting chamber.

References Cited
UNITED STATES PATENTS

| | | | |
|---|---|---|---|
| 1,165,137 | 12/1915 | Smith | 61—11 |
| 1,254,906 | 1/1918 | Henderson. | |
| 1,484,575 | 2/1924 | Shulin. | |
| 2,763,991 | 9/1956 | Kennon | 61—13 |
| 2,817,956 | 12/1957 | Young | 61—13 |
| 3,220,194 | 11/1965 | Lienard | 61—13 |
| 2,536,196 | 1/1951 | MacLeod | 61—13 |

FOREIGN PATENTS 414,698   8/1934   Great Britain.

EARL J. WITMER, *Primary Examiner.*